United States Patent [19]

Lagana

[11] Patent Number: 5,199,383
[45] Date of Patent: Apr. 6, 1993

[54] DOG SPOTTER SAFETY HARNESS

[76] Inventor: Dominic Lagana, R.R. #10, Peterborough, Ontario, Canada, K9J 6Y2

[21] Appl. No.: 650,606

[22] Filed: Feb. 5, 1991

[30] Foreign Application Priority Data

Feb. 5, 1990 [CA] Canada ................... 2009354

[51] Int. Cl.⁵ ............................... A01K 27/00
[52] U.S. Cl. .......................... 119/96; 40/303
[58] Field of Search .......... 119/96, 106, 109, 143, 119/95; 40/300, 303, 586, 218, 640, 6, 908; 350/98; 116/173; 54/79

[56] References Cited

U.S. PATENT DOCUMENTS

| | | | |
|---|---|---|---|
| 1,270,813 | 7/1918 | Gowen | 116/173 |
| 1,741,452 | 12/1929 | Davis | 116/173 |
| 2,409,076 | 10/1946 | Steinberger et al. | 116/173 |
| 2,539,098 | 1/1951 | Pettigrew | 40/303 |
| 2,652,649 | 9/1953 | Kobert | 40/303 |
| 2,976,000 | 3/1961 | Gunderson | 116/173 |
| 3,067,717 | 12/1962 | Imparato | 116/173 |
| 3,241,516 | 3/1966 | Hopkins | 116/173 |
| 3,999,521 | 12/1976 | Puiello | 119/96 |
| 4,137,660 | 2/1979 | Dettmann et al. | 40/303 |
| 4,444,152 | 4/1984 | Berardo | 119/95 |
| 4,445,866 | 5/1984 | Cillieres | 119/96 |

Primary Examiner—Robert P. Swiatek
Assistant Examiner—Todd E. Manahan

[57] ABSTRACT

A safety device for a quadruped animal comprising a harness and a resilient elongated shaft releasably secured thereto at one of its ends. The shaft extends upwardly when the harness is fitted to the animal. The shaft is coiled along its entire length and a flag is securely attached to the other end.

17 Claims, 2 Drawing Sheets

DOG SPOTTER SAFETY HARNESS

The present invention relates to a safety device, and more particularly, to a device to make more visible quadruped animals such as dogs and the like.

BACKGROUND OF THE INVENTION

A problem exists with the Visibility of certain animals, such as hunting dogs, which may expose them to great danger. Thus for example hunting dogs may be surrounded by tall grass, shrubs, trees, standing crops, and the like and are accordingly not visible and often mistaken for game animals and accidentally shot by hungers. Similarly when a pet owner is walking with a pet at nighttime or in adverse visibility conditions, the pet may not be visible to oncoming traffic, risking harm or death.

Because of such dangers, and the concerns of pet owners, it has been thought worthwhile to develop safety devices which will make such animals more visible in such conditions.

Thus, for example, U.S. Pat. No. 4,384,548 issued on May 24, 1983 to Cohn relates to the use of threads having glass reflective elements which are interwoven with the webbing used as a collar and in the leash of an animal so as to render these elements visible at dusk or nighttime. Such a leash/collar arrangement while aimed at the safety of the animal has a limited application inasmuch that it requires a person to hold the leash at all times. Moreover dogs are frequently walking with their nose to the ground rendering reflective collars virtually useless. It is an object of the present invention to provide a safety device that may be used for example on hunting dogs running in woods and the like and which will provide a means for ensuring that the animal will be more visible.

SUMMARY OF THE INVENTION

In accordance with the present invention, there is provided a safety device for a quadruped animal which comprises a harness to be removably fitted to the animal and a resilient flexible elongated shaft. The shaft is sufficiently flexible and resilient to yield when encountering an obstacle and spring back to its initial position when the obstacle is removed. Means are provided to releasably secure one end of the shaft to the harness so that the shaft extends upwardly when the harness is positioned on the animal. A flag is secured on the shaft towards the other end and attaching means are provided to secure the flag to the shaft.

The device can safely be carried by hunting dogs running in woods or tall grass and the like. The device also enables hunting dogs to be more visible and safe.

BRIEF DESCRIPTION OF THE DRAWINGS

These and other objects and advantages of the invention will become apparent upon reading the following detailed description and upon referring to the drawings in which.

Figure 1:
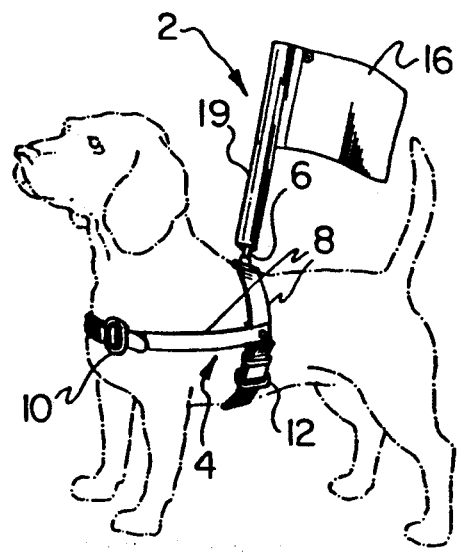
FIG. 1 is a perspective view from the side of the device of the present invention when fitted to an animal.

While the invention will be described in conjunction with an example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

FIG. 1 illustrates a safety device 2 for quadruped animals such as for dogs, made in accordance with the present invention. Safety device 2 comprises a harness 4 and a shaft 6 releasably secured thereto.

Harness 4 is formed of straps 8. The length of straps 8 can be varied by, for example, a pair of buckles 10, 12 so as to allow the harness to fit various sizes of dogs by adjusting straps 8 around the chest and the front legs of an animal as illustrated. The harness is preferably of a fluorescent orange with reflective night strips and a hideaway ID tag.

The elongated shaft 6 is formed of resilient material so that shaft 6 is able to yield when necessary and to spring back to its initial position as illustrated in phantom. It is preferred that shaft 6 be made from spirally wound spring steel forming coils 18 which make up a continuous tightly wound spring. Alternatively the shaft may be made of another appropriately flexible material, such as, for example, plastic. This enables the shaft 6 to yield and then return to an upright position regardless of what obstruction it encounters. This is important.

Figure 2:
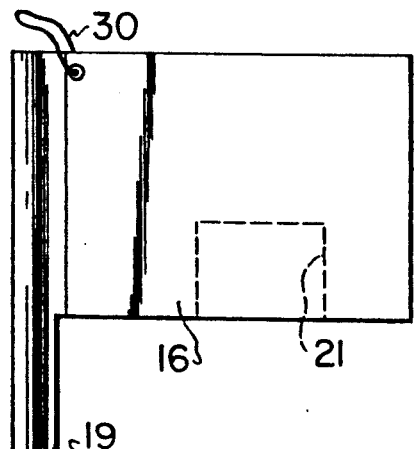
FIG. 2 is an exploded view of the shaft, flag and harness of FIG. 1.

A flag 16 is mounted at the upper end of shaft 6. A sleeve 19 extends from the base of the flag over most of the length of the shaft. Flag 16 and sleeve 19 are fluorescent orange with reflective nighttime strips 20 (FIG. 2). A pocket 21 or other means (phantom FIG. 2) may be provided in flag 16 to receive and carry identification papers for the animal.

FIG. 2 illustrates an example of how the shaft 6 may be secured to the harness 4. At the lower end of shaft 6 is secured a screw 22 which is received in threaded, upwardly opening socket 24 of a base plate base 26 secured to the harness 4. This construction allows for easy removal of the shaft 6 from the harness 4. A leash-receiving ring 28 is secured to the strap 8 of the harness 4. The flag 16 and more particularly the sleeve 19 is securely attached to the shaft by appropriate means such as ties 30 or clips (not shown).

Figure 3:
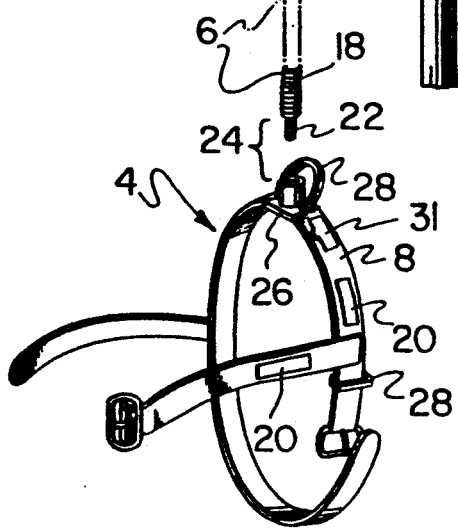
FIG. 3 is a perspective view of a portion of the harness of the device of FIG. 1, illustrating an identification means for an animal.
Figure 3:
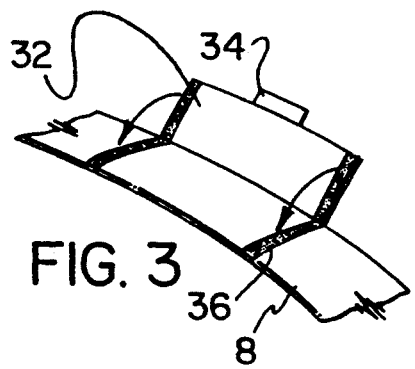

For identification purposes a tag or identification papers holder pocket 31 may be provided on harness 4 as illustrated in FIG. 2. Alternatively, as illustrated in FIG. 3, a hideaway identification arrangement may be provided on harness 4, comprising a cover 32 to which a tab 34 is connected at its one side, and the other side is connected as illustrated, to the webbing of harness 4, so that cover 32 may be folded over to sit on harness 4. Pile fastener means 36 may be provided, at the edges of cover 32, and on the webbing of harness 4, to hold cover 32 in place, when folded over on harness 4. Appropriate information relating to the name of the animal and its owner's name and address, may be printed on the inside of the cover 32 as illustrated. In operation, cover 32 would normally be folded over and secured by means of pile and fabric securing means 36, to harness 4. When a person wished to see the identification information relating to the animal, that person would only have to open cover 32 by means of tab 34, to see the information on the inside of cover 32.

Figure 4:
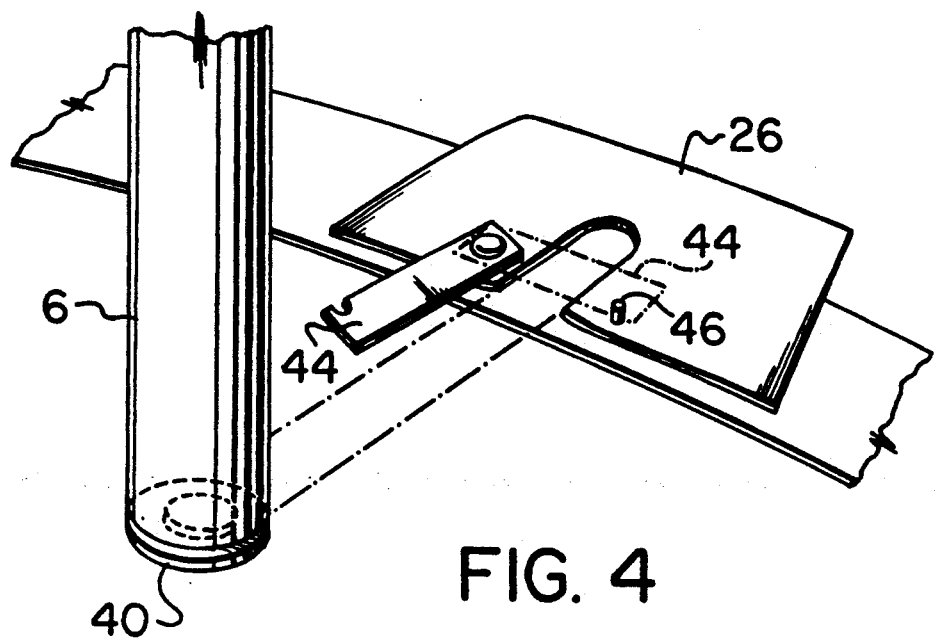
FIG. 4 is a partial view in perspective of a portion of the harness of the device of the present invention on which an alternative mechanism for securing the shaft to the harness is illustrated.

In FIG. 4, an alternative mechanism for securing flag shaft 6 to harness is illustrated. The lower end of shaft 6 is provided with a rivet head 40 releasably lockable in a slot 42 in base plate 26. A spring gate 44 is pivotable into closed position across the entrance to slot 42, once head 40 is in position as illustrated, to hold it in that position. Gate 44 is releasably secured in this closed position by an appropriate means such as stop post 46.

Figure 5:
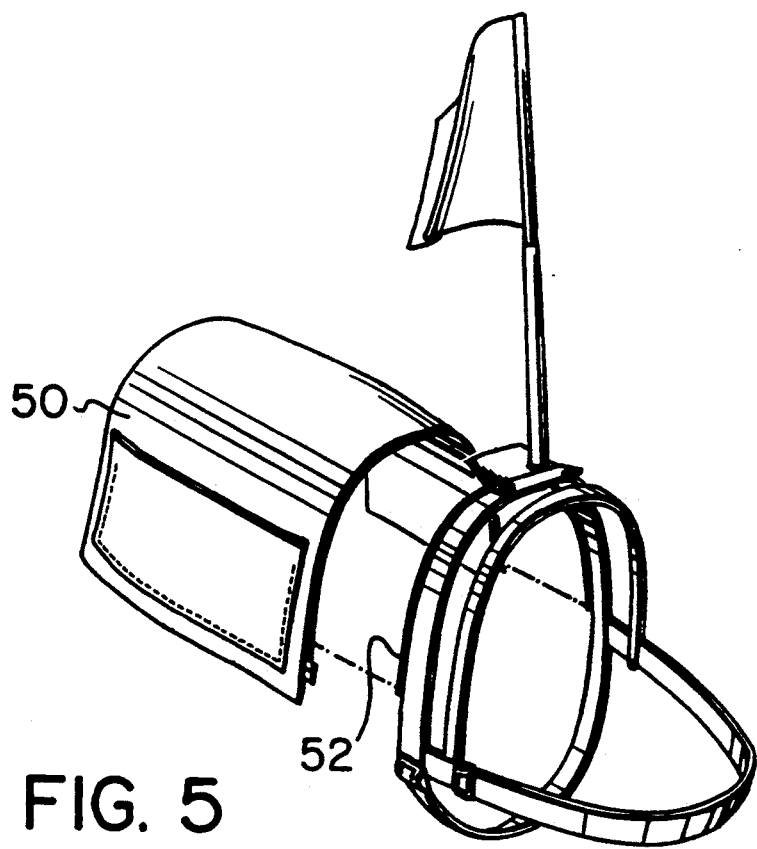
FIG. 5 is a perspective view of a further alternative embodiment of the harness in accordance with the present invention.

In FIG. 5, an alternative embodiment of strap 4 is illustrated in which a flat pouch 50 is provided within which flag 16, sleeve 19 and shaft 6 may be carried when not in use. This pouch 50 is preferably releasably securable to the upper portion of rear strap 8, for example by a zipper 52 as illustrated. It is preferably made of fluorescent orange material as well, to provide even greater visibility of an animal wearing harness 4 when pouch 50 is attached.

The advantages of such device are obvious. The shaft and flag attached to the harness increases the dog's apparent height and renders the animal more visible. Further, the device involves a great degree of safety for the animal itself by providing a shaft which is resilient and flexible thus avoiding any possibility of harm to the dog when going through obstacles. Moreover the shaft being covered by a sleeve will prevent any unwanted element being caught between the coils.

Thus it is apparent that there has been provided in accordance with the invention a dog spotter safety harness that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A safety device for a quadruped animal comprising:
   (a) a harness to be removably fitted to the animal;
   (b) a resilient flexible elongated shaft formed from tightly wound coils extending along its length, the shaft being able to yield when encountering an obstacle and spring back to its initial position when the obstacle is removed;
   (c) means to releasably secure an end of the shaft to the harness so that the shaft extends upwardly when the harness is positioned on the animal, said means comprising a base plate secured to the harness with a U-shaped slot in a central portion of the base plate, a head secured to the corresponding end of the shaft, the head being releasably lockable within said slot to anchor the shaft to the harness; and
   (d) a flag secured to the shaft towards the other end.

2. The safety device of claim 1, wherein the flag is fluorescent.

3. The safety device of claim 1, wherein the harness is fluorescent and with reflective night strips.

4. The safety device of claim 1, wherein the harness comprises straps to extend around the chest and behind the front legs of the animal when fitted to the animal.

5. The safety device of claim 4, wherein the straps are provided with adjustment means so as to permit varying of the lengths of the straps.

6. The safety device according to claim 1, wherein a sleeve extends downwardly from the flag to receive and cover the shaft over most of its length.

7. The safety device of claim 1, wherein the flag is provided with a pocket to receive identification means for the animal.

8. The safety device of claim 7, wherein the harness is provided with a pocket to receive identification means for the animal.

9. The safety device of claim 1, wherein a leash-receiving ring is secured to the harness.

10. The safety device of claim 1, wherein the shaft is made of coiled spring steel.

11. The safety device of claim 1, wherein the harness is provided with an animal identification means comprising a cover secured to the harness, the cover having an inner surface to carry identification information relating to the animal, the cover and harness provided with releasable securing means to hold the cover in closed position on the harness but releasable to expose the inner surface of the cover as required.

12. The safety device according to claim 11, wherein the securing means comprises hook and pile fabric securing means.

13. The safety device of claim 1 further provided with a pouch to contain the shaft and flag when not in use and means on the pouch and harness for releasably securing the pouch to the harness.

14. The safety device of claim 13 wherein the means for releasably securing the pouch to the harness is a zipper.

15. The safety device of claim 13 wherein the pouch is of fluorescent material.

16. The safety device of claim 1 wherein the shaft is of a length such that when the device is worn by an animal and flexed rearwardly the shaft will not protrude beyond the rear of the animal so as to permit another animal to follow in safety.

17. The safety device of claim 1 wherein the slot is further provided with locking means in the form of a flat spring gate pivotably mounted to one side of the base plate across the entrance to the slot and constructed so as to swing into closed position and thereby releasably lock the shaft into the slot.

* * * * *